Figure 1:
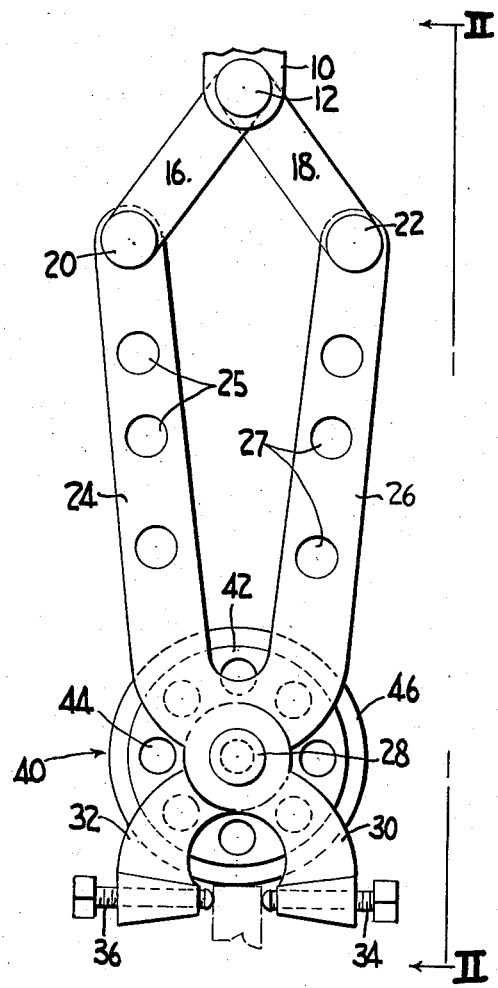

INVENTOR.
RONALD E. RICHARDSON
BY Oscar L. Spencer
ATTORNEY

United States Patent Office 2,991,113
Patented July 4, 1961

2,991,113
SUPPORTING GLASS SHEETS
Ronald E. Richardson, Oshawa, Ontario, Canada, assignor to Pittsburgh Plate Glass Company, a corporation of Pennsylvania
Filed Oct. 23, 1958, Ser. No. 769,171
4 Claims. (Cl. 294—118)

This invention relates to supporting glass sheets, and specifically refers to tongs for gripping glass sheets during thermal treatment. Tongs have been used for supporting glass sheets vertically for thermal treatment by gripping the opposite glass surfaces. The tongs are supported from an overhead monorail which extends through thermal treatment apparatus by means of a supporting clevis mounted to a carriage that rides on the monorail.

Since glass sheets are heated to substantially the softening point during thermal treatment required for tempering or certain coating procedures, the tong points penetrate the glass surfaces and mar the latter. When coated or tempered glass sheets are used as viewing closures, it is necessary that the tong marks formed by tong penetration be kept close to the margin of the glass sheet so they do not mar the vision area.

To avoid the presence of tong marks in the viewing area, glass sheet gripping tongs have been provided with a stop member to limit the uppermost position of the upper edge of the glass sheet supported vertically by the tongs. In the past, the stop member comprised a stop pin welded to one of the tong arms below the common pivot point for the tongs and above the tong points.

As the tong points penetrated into the opposite glass surfaces, the stop members move downwardly and apply a downward force against the upper edge of the glass sheet. This downward force tends to pry the glass from between the tong points, thereby resulting in a reject for breakage.

The present invention prevents this cause of breakage by providing glass support tongs with a different type of stop member for limiting the uppermost position of the top edge of a glass sheet supported for tempering. The stop member according to the present invention limits the uppermost position of the top edge of the glass sheet to one in a horizontal plane below the horizontal axis defined by the common hinge pin and above that of the tong points of the tongs as in the prior art. However, stop members according to the present invention do not move downwardly against the upper edge of the glass sheet as the tong points penetrate the glass.

According to the present invention, the stop member for the tongs comprises an apertured disc that is pivotally mounted to the common hinge pin of glass gripping tongs. The stop may be further provided with circumferentially spaced apertures and a peripheral glass contacting portion of reduced thickness. The purpose of the circumferentially spaced apertures and of the reduced thickness of the peripheral glass contacting edge of the stop member is to minimize the thermal capacity of a member contacting the upper edge of the glass sheet. Minimizing the thermal capacity minimizes the rate of heat transfer between the metal stop member and the glass sheet edge as the glass and its supporting tongs are subjected to changes in temperature during tempering. Unless precautions are taken to minimize the rate of heat transfer, the glass sheet edge develops a non-uniform temperature pattern which results in localized stress patterns formed in the glass sheet at the point of contact between the glass sheet edge and the stop member.

A typical embodiment of the present invention will now be described for purposes of illustrating rather than limiting the present invention. Reference to the latter may be obtained from studying the claims accompanying this description.

Figure 2:
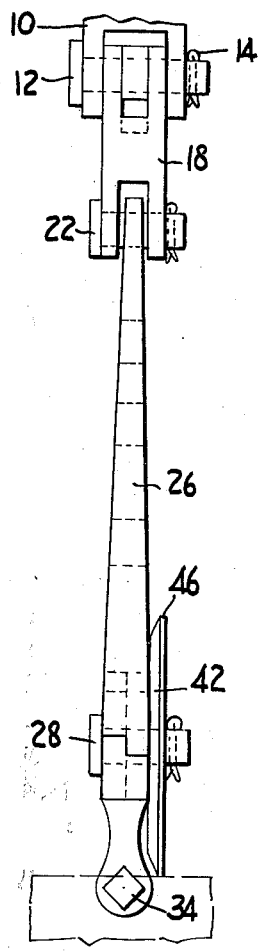
Figure 3:
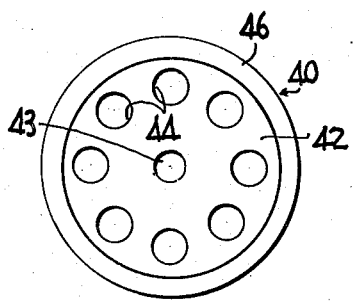
Figure 4:
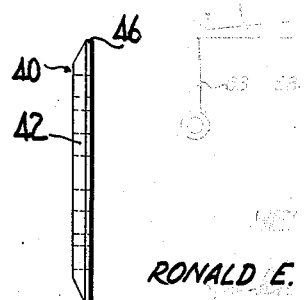

In the drawings which form part of the description,
FIGURE 1 is an elevational view of a pair of glass gripping tongs taken across the thickness of a glass sheet, shown in phantom supported by said tongs.
FIGURE 2 is a view taken at right angles to that of FIGURE 1.
FIGURE 3 is a side elevation of the novel stop member used with glass support tongs.
FIGURE 4 is an end elevation of the element depicted in FIGURE 3 looking at right angles to the view of FIGURE 3.

Referring to the drawings, reference number 10 refers to an apertured clevis carried by a carriage (not shown) supported on a monorail (not shown) which extends through a heating furnace and a quenching station of tempering apparatus or a spraying station of coating apparatus. Since the heating furnace and quenching or spraying stations are not part of the present invention, they will not be described in detail.

The clevis 10 provides a support for a tong support pin 12 which is carried thereby. A cotter pin 14 secures the tong support pin 12 in place on the clevis. Upper links 16 and 18 are pivoted to tong support pin 12 at their upper ends, and at their bottom ends carry one of a pair of link pins 20 and 22, which pivotally secure the upper links 16 and 18 to tong arms 24 and 26.

Tong arm 24 has a series of apertures 25, and tong arm 26 has a series of apertures 27. The purpose of these apertures is to provide different effective lengths for the tong arms 24 and 26 for pivotal attachment to the upper links 16 and 18 to accommodate the tongs for supporting different thicknesses of glass sheets therebetween.

A common hinge pin 28 pivotally secures the tong arms 24 and 26 to each other at their lowermost apertures 25 and 27, respectively. Tong arm 24 terminates in a bottom portion 30, while tong arm 26 terminates in a bottom portion 32. The respective bottom portions are apertured to receive opposed pointed screws 34 and 36 respectively. The pointed screws 34 and 36 form the tong points between which a glass sheet is gripped.

The tong support pin 12, the link pins 20 and 22 and the common hinge pin 28 provide substantially parallel horizontal axes about which the upper links 16 and 18 and the tong arms 24 and 26 pivot relative to each other. The tong arms and links are so constructed that the tong points or pointed members 34 and 36 are urged to have their pointed ends move toward each other to grip the glass sheet therebetween.

According to the present invention a stop member 40 is carried by the common hinge pin 28 in concentric relation thereto. Stop member 40 comprises an apertured disc having an apertured central portion including a central aperture 43 to receive common hinge pin 28 and a plurality of circumferentially spaced apertures 44 whose purpose is to reduce the thermal capacity of the stop member. The peripheral portion 46 of the stop member 40 is reduced in thickness so as to provide a peripheral circular margin that contacts the upper edge of a glass sheet tangentially and prevents further upward displacement of the glass sheet.

When the glass is loaded onto the tongs, its upper edge contacts the peripheral edge 46 of reduced thickness of the stop member 40 and its opposite surfaces are gripped between the tong points 34 and 36. As will be seen from FIGURE 1, tong points 34 and 36 pivot arcuately about a horizontal axis defined by the common hinge pin 28. Thus, when the glass sheet softens, and the tong points penetrate the surfaces of the glass sheet, the vertical component of the radius defined by the distance between each tong point and the common axis of pivoting defined by the common hinge pin 28 increases and the glass sheet is displaced downwardly out of contact with the apertured stop member 40. Therefore, the tongs do not inherently provide a downwardly thrusting movement tending to pry the glass sheet out of the tongs when they approach each other. Furthermore, by virtue of aperturing the stop member and making its margin 46 of reduced thickness, the temperature effect on the portion of the edge of the glass sheet contacting the stop member initially is moderated. Therefore, localized stresses that would otherwise be established by virtue of a steep thermal gradient are minimized because of the moderated temperature pattern resulting from minimizing the thermal capacity of the stop member.

The disc construction of the stop member and its concentric relation to the common hinge pin 28 enables the upper limit of the glass edge positioning to be controlled properly regardless of how the apertured disc is oriented relative to the common hinge pin 28. Furthermore, the circular shape of the periphery of the stop member 40 causes only tangential contact between the disc and the glass edge, thereby further minimizing glass edge to metal disc contact during handling.

What is claimed is:

1. In tongs for supporting a glass sheet comprising a tong support pin, a pair of upper links having an upper portion and a lower portion, each upper link being pivoted at its upper portion to said tong support pin, a pair of tong arms having an upper portion, an intermediate portion and a lower portion, a pair of link pins, one of said link pins pivotally connecting the lower portion of one of said upper links and the upper portion of one of said tong arms, the other of said link pins pivotally connecting the lower portion of the other of said upper links with the upper portion of the other of said tong arms, a common hinge pin pivotally connecting the intermediate portion of one of said tong arms with the intermediate portion of the other of said tong arms, the lower portion of each tong arm extending below said common hinge pin, and a tong point member carried by each last said lower portion, each tong point member extending toward the other tong point member to provide opposed tong points, the improvement comprising a stop member for limiting the uppermost position of the top edge of the glass sheet, said stop member comprising a disc pivotally supported by said common hinge pin in concentric relation thereto and having a peripheral portion of reduced thermal capacity compared to that of its main body, the lowermost portion of the periphery of said disc being located below the intermediate portion of said pivotally connected tong arms and above an axis common to said opposed tong points.

2. Apparatus as in claim 1, wherein the disc has a peripheral portion of reduced thickness compared to its main body.

3. Apparatus as is claim 1 wherein the disc has a plurality of circumferentially spaced apertures located inboard of the disc periphery.

4. Apparatus as in claim 1, wherein the disc has a plurality of peripherally spaced apertures located inboard of the disc periphery, and the disc periphery is reduced in thickness compared to the main body of the disc.

References Cited in the file of this patent

UNITED STATES PATENTS

| | | |
|---|---|---|
| 2,156,735 | Packer | May 2, 1939 |
| 2,174,254 | Black | Sept. 26, 1939 |
| 2,618,505 | Rosenbaum | Nov. 18, 1952 |
| 2,646,307 | Phalin | July 21, 1953 |